G. F. HOLMES.
Hay Raker and Loader.
No. 87,045.
3 Sheets—Sheet 1.
Patented Feb. 16, 1869.
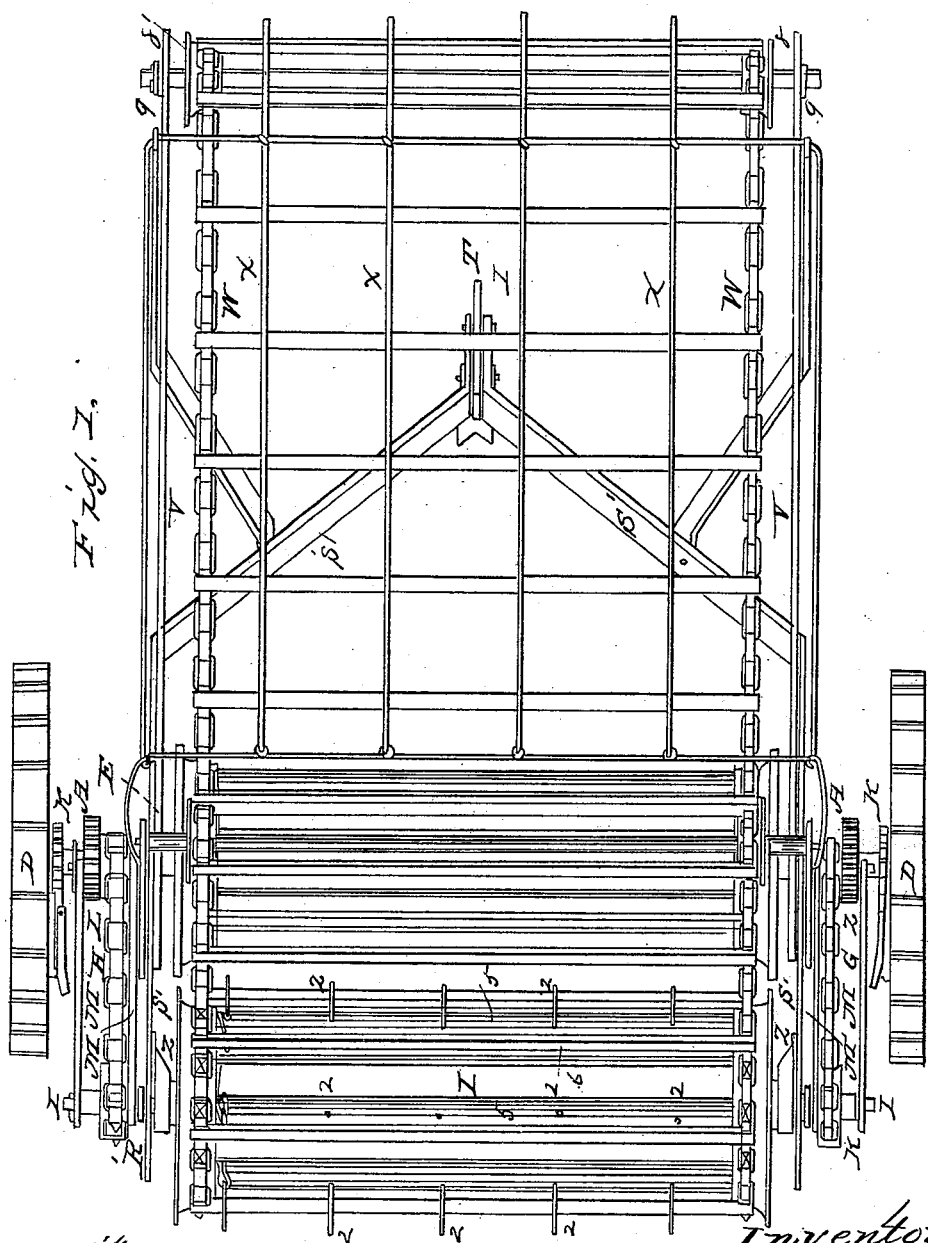

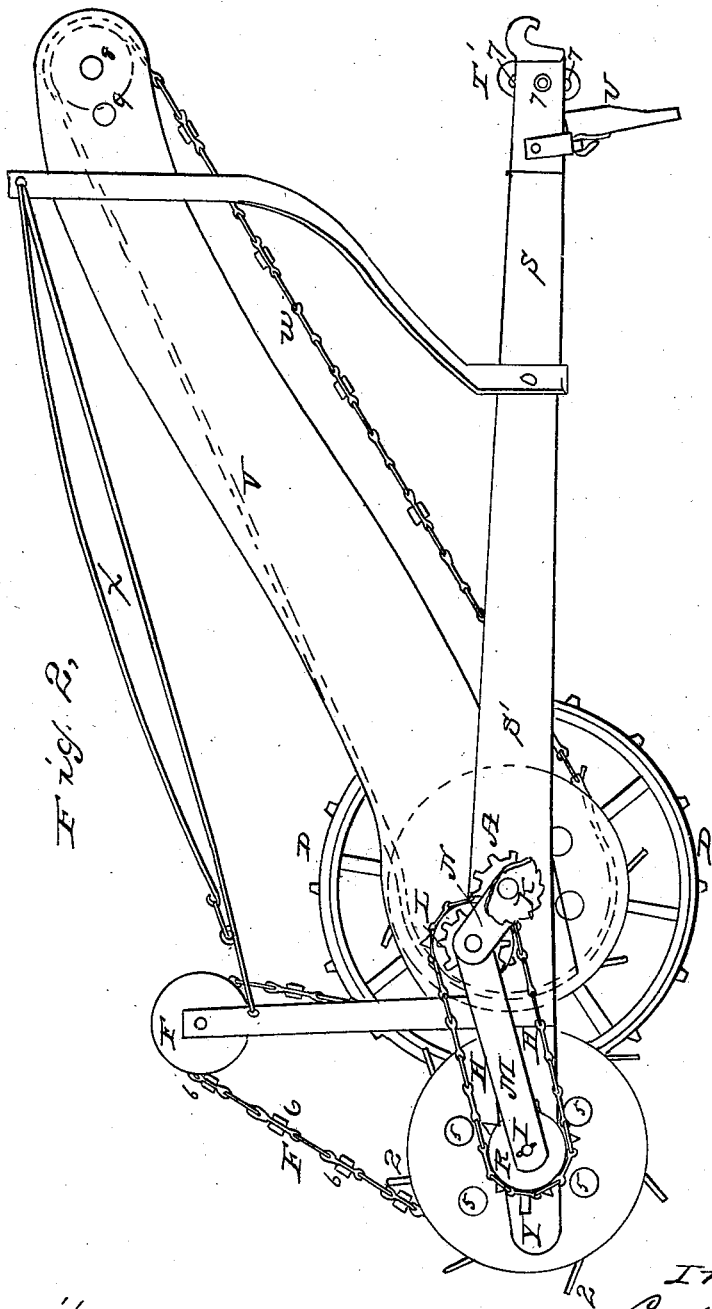

G. F. HOLMES.
Hay Raker and Loader.
No. 87,045.
3 Sheets—Sheet 3.
Patented Feb. 16, 1869.
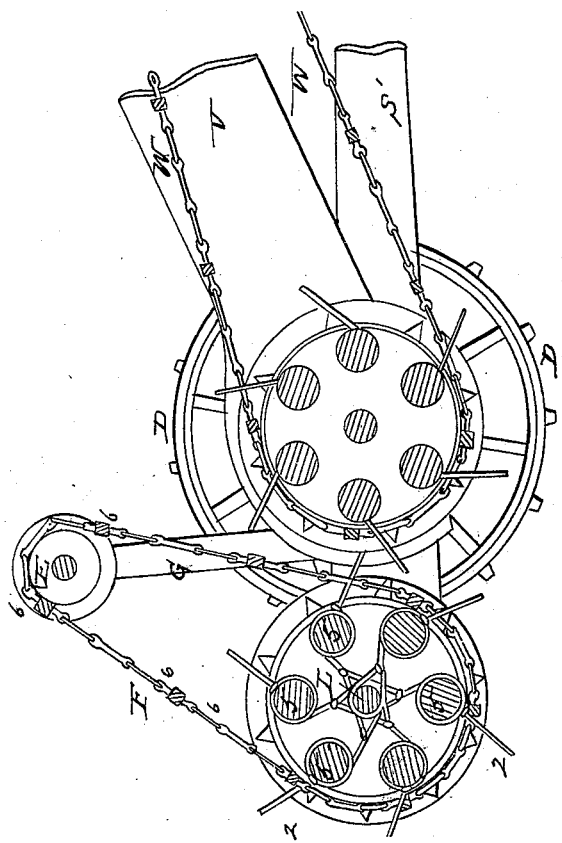
Witnesses:
Harry King
Arthur Holmes
Inventor:
Geo. F. Holmes
per Geo. E. Jaxoly.

GEORGE F. HOLMES, OF CORTLAND, NEW YORK.

Letters Patent No. 87,045, dated February 16, 1869.

IMPROVEMENT IN HAY-RAKERS AND LOADERS.

The Schedule referred to in these Letters Patent and making part of the same.

*To all whom it may concern:*

Be it known that I, GEORGE F. HOLMES, of Cortland, in the county of Cortland, in the State of New York, have invented a new and improved Machine for Raking and Loading Hay; and I do hereby declare that the following is a full and exact description thereof, reference being had to the accompanying drawings, and to the letters of reference marked thereon.

Figure 1 is a plane view of my machine.
Figure 2 is a side view of the same.
Figure 3 is a sectional view.

The nature and object of my invention are to rake up hay, grain, straw, or other similar material, and place the same upon the wagon, or other vehicle, direct, and by a single operation.

To enable others skilled in the art to make and use my invention, I will proceed to describe its construction and operation.

My machine is attached to the hind axle of the wagon, or other vehicle, by the hook T, at the extremity of the tongue S.

The tongue S, branching, extends, in S' S', parallel with the end of the rake-head and securing-rake head.

The drive-wheels D D are connected by an axle, which extends through the extension S' of the tongue and the elevator-slides V V'.

Inside the arms, or sides of the elevator, and around the axle, as a centre, is constructed a shaft, of circumference suitable for the object to be obtained, and into this are fixed the permanent teeth 3, 3, 3.

The best form of constructing this cylinder is in the form of round rods, or bars, reaching from one end to the other, and of sufficient strength to receive and carry the hay or grain to the endless chain, by which it is conveyed to the wagon. These rods are secured in cog-wheels at either end.

The endless carrier W runs upon these cog-wheels, and the wheels are, themselves, set in motion by the driving-wheels D D.

Attached to the axle of the driving-wheels is a small cog-wheel at either side of the elevator A A.

These wheels revolve with the axle of the driving-wheels, and set in motion the small cog-wheels, located above and a little to the rear of the wheels A A, and are constructed to revolve in connection.

These wheels, L L', are connected with the wheels R R', on the end of the axle of the revolving rake head.

The wheels L and K and L' and K' are kept at the same tension by the side-bars, or braces M M', and an endless chain, or belt, runs over the wheel R, and around an extension of the wheel L.

By this endless chain, or belt, motion is communicated from the axle of the driving-wheels, through wheel L, to the axle of the rake-head, which is caused, thereby, to revolve whenever the motive-power is applied to the driving-wheels.

The motion of the machine is regulated by a small ratchet-wheel, K, on the axle, within and near the driving-wheel.

The wheels L and A are held in position by side-braces N N', as shown.

The rake-head is constructed upon an axle passing through the wheels R and R', and of convenient size.

The ends of the head are made with a flat surface, on the outside, and a cog-wheel, on the inner surface, for passage of the belt F.

The rods, to which the teeth are attached, are secured to the end-piece in any suitable manner.

The rake-teeth are securely fixed into the cross-rods 5, 5, 5.

The teeth, 2, 2, 2, are firmly set in the bar, but the bar, or rod itself, is regulated by a spring attached to the shaft I, and passing around the rod 5, and secured to one end of the teeth, or otherwise, and so adjusted that, when the teeth, one or more of them, meet an obstruction, the spring yields, and the teeth pass the obstacle without difficulty.

G and G' are two standards, supporting the wheels E E'.

Over these wheels, which are connected with an axle, or shaft, and around the wheels, forming the ends of the rake-head, passes a belt, F F'.

From belt to belt are slats, 6, 6, 6.

This apron, so constructed, works in harmony with the carrier W, which removes the hay from the rake to the wagon.

X X X are rods, extending from near the standards G G', to the advance end of the elevator, and are so adjusted as to allow free passage of the hay, and, at the same time, prevent it from being carried away by the wind.

Near the rear end of the extended tongue S' is cut a slot, Y, as appears in fig. 2.

In this slot the axle of the rake-head plays, and is regulated by a self-acting spring, Z. By this arrangement, a proper tension of the endless chain and belt is secured.

The rake-head is lowered or elevated by an adjustment of the hook of the tongue.

Just back of the hook is the cross-piece T', fig. 2, which has three or more holes, 7, 7, 7, with a pin passing through the tongue and one of the small holes. As this is raised or lowered, a counter-action is given to the rake-head, and it may be adjusted at pleasure.

The endless carrier passes over wheels 8 8', which are connected by a rod, or shaft, and elevated in such a position as secures room for loading the hay upon the wagon.

The wheels are held in position by means of the axle passing through the frame of the elevator at 9 9'.

The operation of my machine is simple.

The hook T is attached to the axle of the wagon, and moves with it.

The drive-wheels are set in motion, and, through the wheels and endless chain, hereinbefore described, motion is communicated to the rake-head, which gathers up the hay or grain, and carries it up between the rake-head and the wheel containing the fixed teeth.

The hay or grain, as it is raised toward the carrier, is taken up by the fixed teeth, and is thrown upon them by means of the slats, or cross-bars, attached to the belt passing over the pulley-wheels. The raking-teeth are entirely cleared by means of these slats. The hay or grain is deposited, by the receiving-teeth, directly upon the carrier, which revolves whenever the driving-wheels are in motion, and is by it carried to the load.

My improvement enables me to work the raker and loader wherever a wagon can be driven, and it performs the labor with success, whether upon smooth or rough land.

The size and material to be used are adapted to the wants and convenience of the operator and builder.

My invention is simple in its construction.

The machine is constructed with little expense, and is durable in service.

The standard-bar U is adjusted by a hinge, so that backing the wagon slightly will detach it when desired.

What I claim as my invention, and desire to secure by Letters Patent, is—

1. The revolving rake-head, with pliable teeth, and the receiving-head, in combination with the belt F, with cross-bars, and single endless carrier, arranged as and for the purpose specified.

2. The wheels L and A, with ratchet-wheel K, endless chain H, and the braces M and N, in combination with the wheel R, and all so adjusted as, in operation, to cause the collecting and receiving-rake heads to revolve in and toward each other, as shown.

GEO. F. HOLMES.

Witnesses:
ARTHUR HOLMES,
M. J. WOODS.